United States Patent
Steinberger et al.

(10) Patent No.: US 11,580,623 B1
(45) Date of Patent: Feb. 14, 2023

(54) HIGH EFFICIENCY DYNAMIC CONTRAST PROCESSING

(71) Applicant: Freedom Scientific, Inc., Clearwater, FL (US)

(72) Inventors: Robert A. Steinberger, Palm Harbor, FL (US); Spencer Fleming, Melbourne, FL (US)

(73) Assignee: Freedom Scientific, Inc., Clearwater, FL (US)

( * ) Notice: Subject to any disclaimer, the term of this patent is extended or adjusted under 35 U.S.C. 154(b) by 0 days.

(21) Appl. No.: 17/691,791

(22) Filed: Mar. 10, 2022

(51) Int. Cl.
G06T 5/00 (2006.01)
G06V 10/60 (2022.01)
G06T 7/11 (2017.01)
G06V 10/22 (2022.01)
G06T 7/90 (2017.01)
G06T 3/40 (2006.01)

(52) U.S. Cl.
CPC .............. *G06T 5/007* (2013.01); *G06T 3/40* (2013.01); *G06T 5/002* (2013.01); *G06T 5/003* (2013.01); *G06T 7/11* (2017.01); *G06T 7/90* (2017.01); *G06V 10/23* (2022.01); *G06V 10/60* (2022.01); *G06T 2207/10024* (2013.01); *G06T 2207/20021* (2013.01); *G06T 2207/20208* (2013.01)

(58) Field of Classification Search
CPC ........... G06T 2207/10024; G06T 2207/20192; G06T 11/001; G06T 5/009; G06T 5/40; G06T 3/4007; G06T 5/007; G06T 7/11; G06T 7/90; G06T 3/40; G06T 5/002; G06T 5/003; G06T 2207/200121; G06T 2207/20208; G06V 10/23; G06V 10/60
USPC ............................................... 382/167
See application file for complete search history.

(56) References Cited

U.S. PATENT DOCUMENTS

| | | | | |
|---|---|---|---|---|
| 8,873,821 | B2* | 10/2014 | Smith | G06T 5/003 382/131 |
| 2006/0204124 | A1* | 9/2006 | Aihara | H04N 1/4074 382/167 |
| 2011/0091127 | A1* | 4/2011 | Kisilev | G06T 5/002 382/274 |
| 2018/0374203 | A1* | 12/2018 | Xiao | G06T 7/90 |
| 2019/0188835 | A1* | 6/2019 | Loginov | G06T 5/008 |
| 2022/0076392 | A1* | 3/2022 | Kountchev | G06T 5/40 |

OTHER PUBLICATIONS

Robert D. Fiete, "Image Enhancement Processing," "Modeling the Imaging Chain of Digital Cameras" (Year: 2010).*

Herk, A fast algorithm for local minimum and maximum filters on rectangular and octagonal kernels, Pattern Recognition Letters 13, 1992, pp. 517-521.

* cited by examiner

Primary Examiner — Kenny A Cese
(74) Attorney, Agent, or Firm — Anton J. Hopen; Smith & Hopen, P. A.

(57) ABSTRACT

A high efficiency method of processing images to provide perceptual high-contrast output. Pixel intensities are calculated by a weighted combination of a fixed number of static bounding rectangle sizes. This is more performant than incrementally growing the bounding rectangle size and performing expensive analysis on resultant histograms. To mitigate image artifacts and noise, blurring and down-sampling are applied to the image prior to processing.

17 Claims, 9 Drawing Sheets

*(prior art)*

HIGH EFFICIENCY DYNAMIC CONTRAST PROCESSING

BACKGROUND OF THE INVENTION

Electronic magnification devices use a combination of optical and digital magnification to allow access to video information for low vision individuals. Digital magnification of real-world images and video blurs the edges of the content. Further, any objects that have low contrast with the background are difficult to see. This effect becomes worse with magnification. Image processing, specifically contrast and edge detection are possible but often require intensive processing not available on mobile devices.

1. FIELD OF THE INVENTION

The described embodiments relate generally to image processing. Specifically, the described embodiments relate to systems and methods for qualitatively enhancing perceived contrast and edge detection on mobile devices with limited image processing affordances.

2. DESCRIPTION OF THE RELATED ART

Contrast ratio in general is an important aspect of image adjustment. It is the ratio of luminance of the lightest shade (ultimately white) to that of the darkest (e.g., black). From a utilitarian perspective, high contrast imagery is preferrable to clearly identify elements and boundary edges within an image. Images having a higher contrast level generally display a greater degree of color or grayscale difference than low contrast images.

Dynamic Contrast Processing is all about finding getting the "best" separation of the dark and light elements of an image. To do this we operate solely on the grayscale image. Every grayscale pixel in the image is replaced in a new image with a value found by traversing an S-curve graph representing the contrast change. For non-dynamic processing, the values and shape of the graph are constant across all pixels of the image; however, for dynamic processing the values and shape of the graph are specific to localized information about each pixel as it is examined.

The definition of "best", the speed of the computation, the type of curve, and the parameters that define the curve are all variables that can be used to customize the algorithm. The highest detailed model of the "best" separation would find the area around the pixel in which the histogram contains enough pixels to clearly differentiate foreground from background pixels. This can be observed by having a histogram with a clear bimodal graph. The smaller peak would be assigned as the foreground and the larger peak would be assigned as the background. The common algorithms associated with finding contrast in images of text choose an area that is large enough to contain a single character of text.

It is possible that these approaches eliminate outliers by combining buckets from the left and right side of the histogram simultaneously. When the number of pixels in a bucket is too low, it would be added to the next bucket in the direction travelled until the midpoint of the histogram is reached.

A problem with this approach is that the histogram area when convolved across every pixel in the entire image may not be bimodal. This usually results in running the full scan again with a larger area in hopes that the larger area would have a bimodal representation. Alternatively, for speed, a rule, such as midpoint, may be applied to split the area of the histogram between low and high to create approximate foreground and background peaks to use. Using the repeat approach is slow, and using the approximation usually results in bad data and noise in zones of a consistent color. The net result of the approximation approach is an image that has good information around the edges of higher contrast, but the color either flips or becomes noisy (random pixels of either foreground or background color) as the contrast becomes similar. Text or objects that are larger than expected in either approach usually result in images showing hollow objects or text with rough inside borders.

To improve the output quality, we grow the rectangle of interest. Accordingly, histograms would need to be calculated at each pixel for multiple rectangles. Given these histograms, each would need to be adjusted and analyzed to find the bimodal peaks. These steps require both a large amount of memory and a large amount of time.

There are ways to reduce the time by maintaining a histogram in an integral image (also known as a summed area table). A serial pass through each pixel in the image is required to accumulate values for all pixels. There are ways to get some parallelization of this, but these methods tend to add memory and require many passes. It requires memory to store a histogram for every pixel containing all values for the histogram for all pixels up to and including the current pixel.

Neither the analysis of histograms nor the generation of integral images is GPU friendly. There are techniques that increase the parallelism at the cost of multiple passes and additional memory. The number of passes, however, prevents this method of finding the best contrast from being realistic for the constraints of this system. Additionally, the large amount of memory required for a histogram-based integral image is also not friendly to a low-end system. Each histogram requires at least 256 32-bit (4 bytes) accumulators for 1080p video, and there is one histogram per pixel. The contents of the histograms alone would require more than 2 GB for a 1080p image.

SUMMARY OF THE INVENTION

A goal of contrast processing is to optimize the visual presentation of video and images to enhance the reading of text in either full color or two-tone modes. Most other methods focus on increasing the contrast to bring out the difference between features in a scene. As described in the constraints section below, the enhancements must be applicable in real-time at a minimum of 60 frames per second (FPS) on a common and inexpensive mobile processor without introducing frame loss or additional latency.

The design favors solutions that require a small number of passes over a frame preferring parallel processing of every pixel nearly simultaneously. The solutions must be applied in parallel with other processing on the device and can run on a graphics processing unit (GPU), field programmable gate arrays (FPGA), or other highly parallel computing hardware. Any algorithmic work should be performed on the parallel processor (GPU, FPGA, etc.) avoiding the central processing unit (CPU) as much as possible.

Solutions that can run on heavily down-sized images are preferred over solutions that must run at full resolution. A key element of the philosophy is that we are not seeking a mathematically perfect solution. We are seeking a solution that yields a significant qualitatively enhanced visual experience for our low vision users. As the specifics of the customers' visual experience is personal to each customer, the results must be easily adjustable in a predictable manner.

An embodiment of the invention includes a computer-implemented method of enhancing image contrast in a digital image. This is done by a number of steps. A grayscale version of the image is first created. A fixed number of bounded rectangle processing loops are set. Rather than incrementally growing the bounded rectangle (which is CPU-intensive), the subsequent (larger) bounded rectangle is a fixed constant value. Each pass involves generating from a first pixel in the grayscale version, a first range of pixel intensities derived from neighboring pixels to the first pixel within a first bounded rectangle dimension and saving the first range.

It is then determined if the minimum and maximum values of the first range is adequate for a threshold contrast quality value. If the range is adequate, we move onto the next pixel. However, if insufficient, we apply a second, larger bounded rectangle within an array of fixed constant-dimensions rectangles and generate from the first pixel in the grayscale version, a second range of pixel intensities derived from neighboring pixels within the second bounded rectangle.

We save the second range of pixel intensities and repeat the process until the minimum and maximum value of pixel intensities bounding the first pixel meet the threshold contrast quality value. Alternatively, we can achieve satisfactory qualitative results by simply processing a fixed number of static-dimensioned bounding rectangles within an array to each pixel. In our specification examples, we use three (3). This process is repeated for each pixel in the grayscale version. From this, we generate a high contrast image from the pixel intensity ranges obtained for each pixel in the grayscale image that meet the threshold contrast quality value.

Because we are not using continuous growth of the bounded rectangle, image artifacts may appear. To accommodate this, we apply a blur filter to each of the pixel intensity ranges prior to generating the high contrast image.

The S-curve used herein is the logistic curve (aka sigmoid), as it is smoother than a linear curve and favors the edges which is appealing for high contrast. A linear curve would work as well and is slightly cheaper to compute but subjectively appears less clean. We may predetermine an S-curve graph in which the y-axis is the a range from 0.0 to 100.0. The x-axis represents the actual value of pixel in the unmodified image from in a range from 0.0 to 100.0. The S-curve is defined by single horizontal line segments at both the left and right end of the x-axis connected by a sloped line. The left horizontal is at y=0.0, and the right horizontal is at y=100.0. The center of the slope is based on local range of grayscale are around the pixel as described in the steps that follow. The slope value is a predefined constant. We have chosen 5.0, but it could be any value. When we go to generate the high contrast image, we divide the pixel intensity range by two and set the quotient as the center of the slope in the S-curve. We apply the S-curve to the unmodified grayscale value to obtain the new pixel value in the high contrast image. Users may also apply a bias offset to the center of the slope in the S-curve whereby the bias offset causes the resultant high contrast image to be lighter or darker. The full formula:

$$\frac{1}{1+e^{\left(\frac{-Slope}{Range}*\left(x-\left(\frac{Range}{2}\right)-(Min+Offset)\right)\right)}}$$

From the logistic equation with a max height of 1:

$$\frac{1}{1+e^{-k(x-x_0)}}$$

The value $x_0$ is the center, which for us is the midpoint of the min and max which is equal to:

Min+(Range)/2

To shift the slope to favor either dark or light we apply an offset as well. The value k in the logistic equation is Slope/Range. In this way, a bigger range will correspond to a smaller K value and thus a gentler curve. A smaller range will correspond to a bigger K value and a tighter curve. The slope constant allows further manual adjustment to control whether all curves are tighter or wider.

In addition, when we establish a predetermined S-curve, we set a slope (or steepness) value constant. Adjusting that constant controls the number of transitional gray values used in each pixel intensity range. To make the process more processor-friendly we may split the calculation of the minimum and maximum pixel intensities into two passes where a first horizontal calculation value is used to calculate a vertical value.

In an alternative embodiment of the invention, we output from the grayscale version, range images using red and green channels. We then scale and blur each range image to the size of the grayscale version and calculate the best fit range in the red and green channels. We scale and blur the combined ranges and then from the original image, S-curve and combined ranges we generate a new high contrast image. Red is mapped to minimum pixel intensities from the grayscale version and green is mapped to maximum pixel intensities from the grayscale version.

In yet another embodiment of the invention, we convert the image to a hue, saturation and luminosity (HSL) color domain and apply the process as noted supra. Then, when generating the high contrast image, we only modify the luminosity of the HSL color domain with our new high-contrast values. In this way, the hue and saturation of the original image are preserved while the contrast is enhanced.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Pixels in Digital Images

Digital images are constructed of 2-dimensional arrays of integers. These represent the individual pixels of the image. The number of gray levels (grayscale) attributed to each pixel is defined by the number of bits. For example, pure black and white is binary, either zero (black) or one (white). Increasing the number of bits providers higher granularity in the number of shades of gray. To render a color image, you simply combine multiple monochrome images. A red-green-blue (RGB) image is combination of three separate 2-dimensional arrays of pixels that are interpreted as red, green and blue.

Image Histograms

A histogram is a chart that plots the distribution of a numeric value as a series of bars, lines or points. A histogram of an image is a graph of pixel intensity (x-axis) against the number of pixels (y-axis). On the x-axis, all the available gray levels are presented. On the y-axis, the number of pixels that have a certain gray-level value are presented. A histogram of a RGB image maybe displayed in separate histograms for each color intensity (one for red, one for green and one for blue).

Histogram patterns and distributions convey important information about the image. The sum of the pixels for each gray level is the total number of pixels in the image. Histogram values distributed to the left of the graph represent darker images while values distributed to the right of the graph are lighter images. Where the histogram is distributed across the entire range of gray levels, the image will have good contrast. In contradistinction, histograms of low-contrast images show gray level distributions restricted to a more narrow range on the x-axis.

Dynamic Contrast Processing

Figure 1:
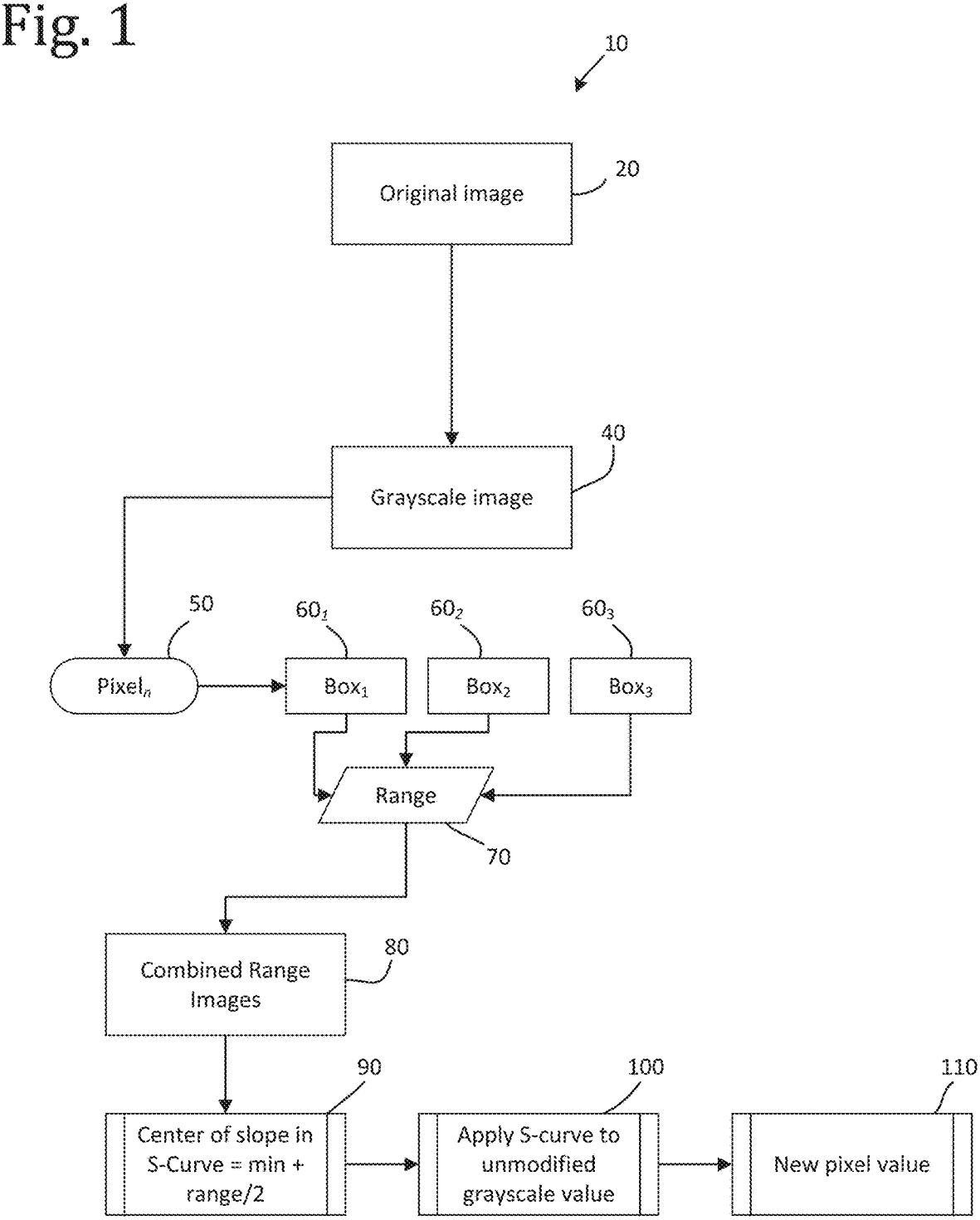
FIG. 1 is a diagrammatic view of an embodiment of the invention featuring dynamic image contrast.

Dynamic contrast processing is all about finding the best separation of the dark and light elements of an image. To do this we operate solely on the grayscale image. Referencing FIG. 1, an overview of the general process 10 applied to an original image 20 includes:

1. The x-axis represents the actual value of pixel in the unmodified image from in a range from 0.0 to 100.0. The S-curve is defined by single horizontal line segments at both the left and right end of the x-axis connected by a sloped line. The left horizontal is at y=0.0, and the right horizontal is at y=100.0. The center of the slope (steepness) is based on local range of grayscale are around the pixel as described in the steps that follow. The slope value is a predefined constant. An exemplary predefined constant may be 5.0, but it could be any value.
2. The original image 20 is converted to grayscale image 40.
3. For each $pixel_n$ 50:
   a. Find the minimum and range of the grayscale image in a first statically-sized box $60_1$ surrounding the pixel.
   b. Apply a second statically-sized box $60_2$ of a different size and gather minimum and range.
   c. Apply a last statically-sized box $60_3$. In this example, three (3) fixed sizes boxes are computed simultaneously for all pixels regardless of which pixels will end up using which level (or combination of levels due to interpolation).
   d. Store the resulting range and minimum 70 for use in subsequent calculations.
4. Generate the new, high contrast image 100 from the combined ranges 80.
   a. Using (maximum−minimum)/2.0 as the center of the slope in the S-curve 90.
   b. Apply the S-curve to the unmodified grayscale value 100 to obtain the new pixel value 110.

Figure 2:
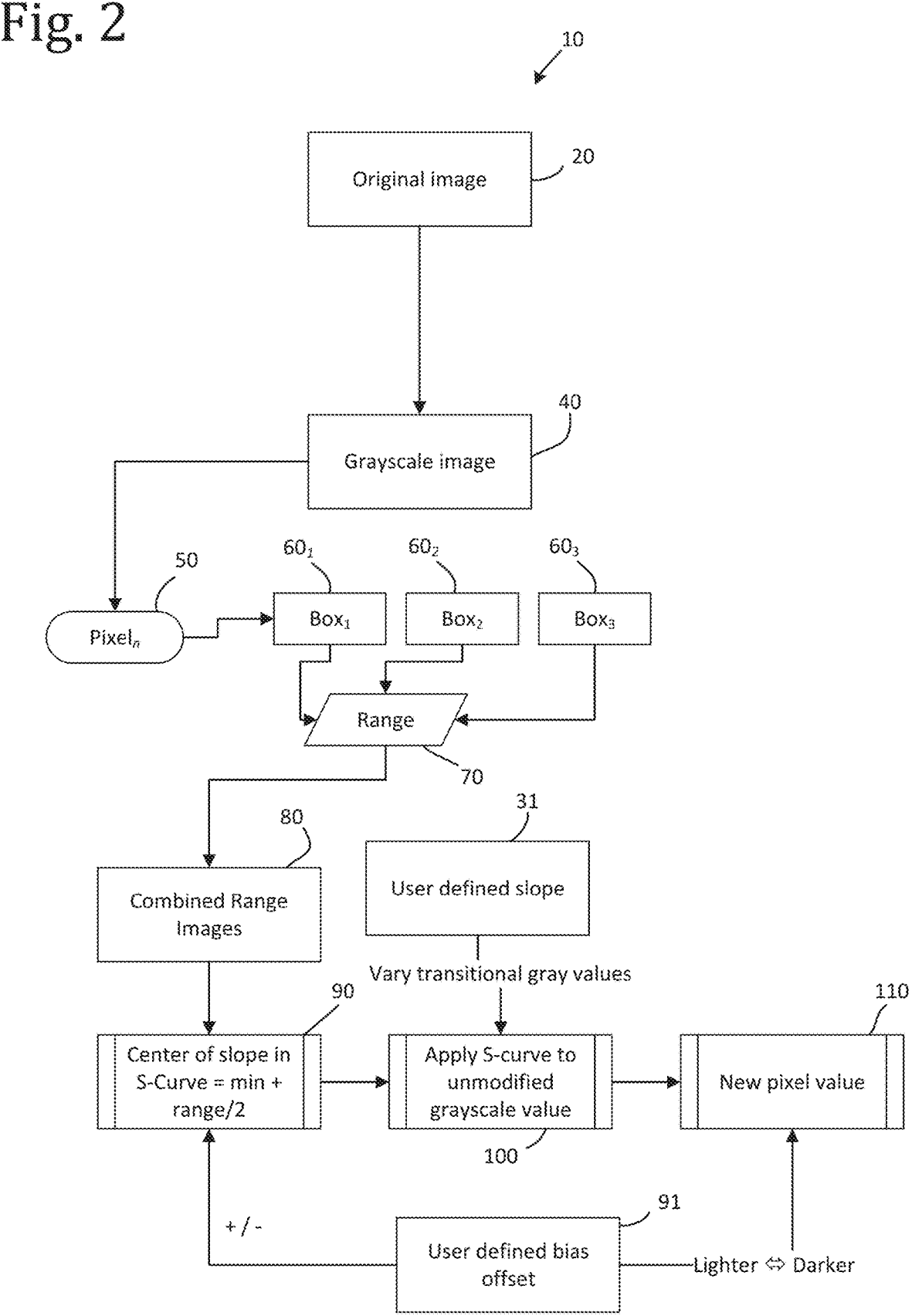
FIG. 2 is a diagrammatic view of an alternative embodiment of the invention featuring dynamic image contrast with user-defined constants for slope and bias offset.

To make the model configurable by the end user, FIG. 2 shows two variables can be altered. A user defined slope 31 alters the number of transitional gray values that are used. A bias offset 91 applied to the center in step 4a above can be used to bias the results to either lighter or darker.

Making the Minimum and Maximum Fast and Effective

Figure 3:
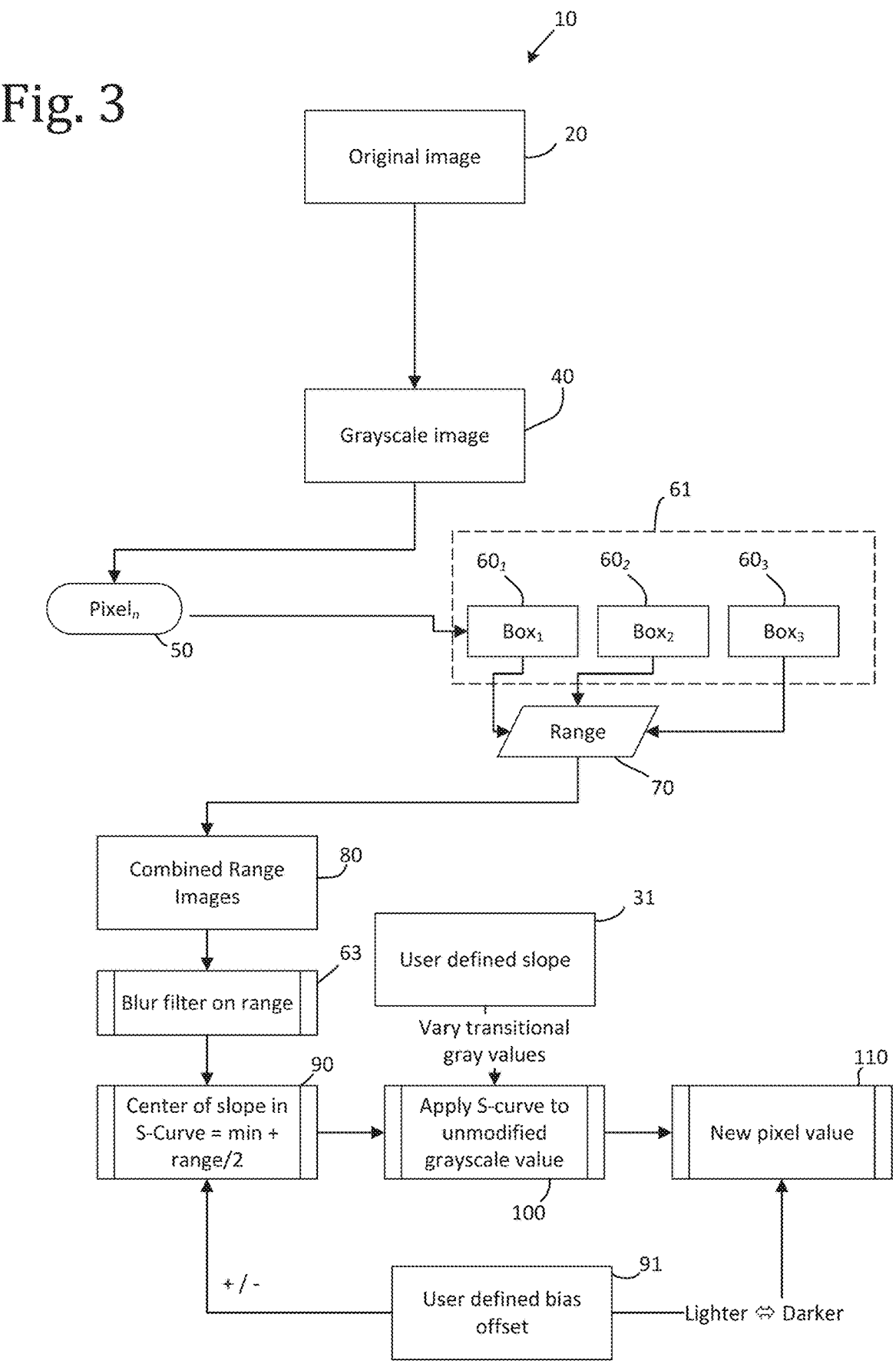
FIG. 3 is a diagrammatic view of an alternative embodiment of the invention featuring dynamic image contrast with improved processing speed by employing a fixed number of a bound rectangles.

Turning now to FIG. 3, key to the technique described above is the computation of minimum and maximum as well as the size of the box around the pixel. The calculation of minimum and maximum can be unfriendly to the GPU especially as described above with continuous growth of the rectangle of interest until adequate minimum/maximum range is found. This would require multiple repeated passes slowing the process down and dropping below acceptable performance criteria.

To speed the processing, we use a fixed array 61 of bound rectangles each of differing constant dimensions. Not using the continuous growth, however, can cause odd image artifacts in the results. We accommodate for this by applying a blur filter 63 to the range results prior to using them. This smooths the artifacts such that they are not visually apparent. In addition to a blur to smooth the image, the final min and max used are interpolated from the discrete box sizes. For example, if the 'target' range is 15 and the small box has a range of 12 and the medium box a range of 25, the final value will be a weighted mix of the small and medium heavily weighting the small. This allows us to guess at what the min and max would have been had there been an unlimited number of box sizes instead of only 3.

Figure 4:
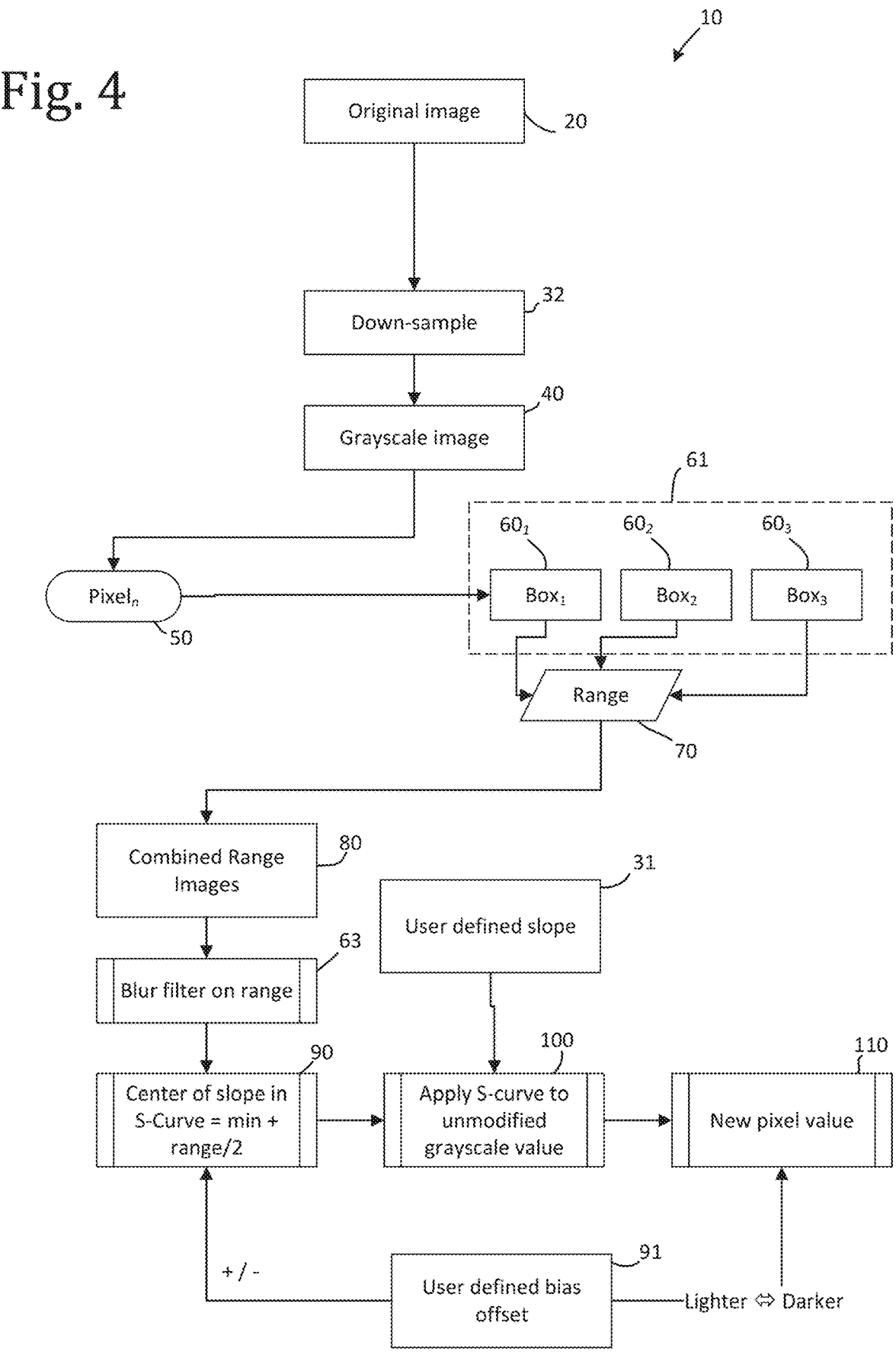
FIG. 4 is a diagrammatic view of an alternative embodiment of the invention featuring dynamic image contrast with improved processing speed by down-sampling the image prior to applying range calculations.

Further, image noise can dramatically affect minimum and maximum causing outliers to dramatically affect the results. As shown in FIG. 4, we solve this by down sampling 32 the image prior to performing the calculation. A small down sample clears much of the noise from the minimum and maximum range.

Using a technique based on Van Herk (see M. van Herk. A Fast Algorithm For Local Minimum And Maximum Filters On Rectangular And Octagonal Kernels. Pattern Recogn. Lett., 13:517-521, 1992.), we make the processing of the minimum and maximum easier on the GPU by splitting it into two passes through the kernel. We first compute the horizontal, and then we use the results to calculate the vertical. We do this using a consistent small kernel to reduce the probability of running into memory paging wait states on the GPU.

Finding the Best Range

For a given image, the grayscale and range images are computed across for the entire image. A predefined constant minimum range is used to allow variations in what appears to be a solid background. For each pixel, the grayscale value and the minimum and maximum ranges are collected from each range image. The minimum and maximum values from the range image with the smallest rectangle with at least the constant minimum range are used when applied in the S-curve.

Figure 5:
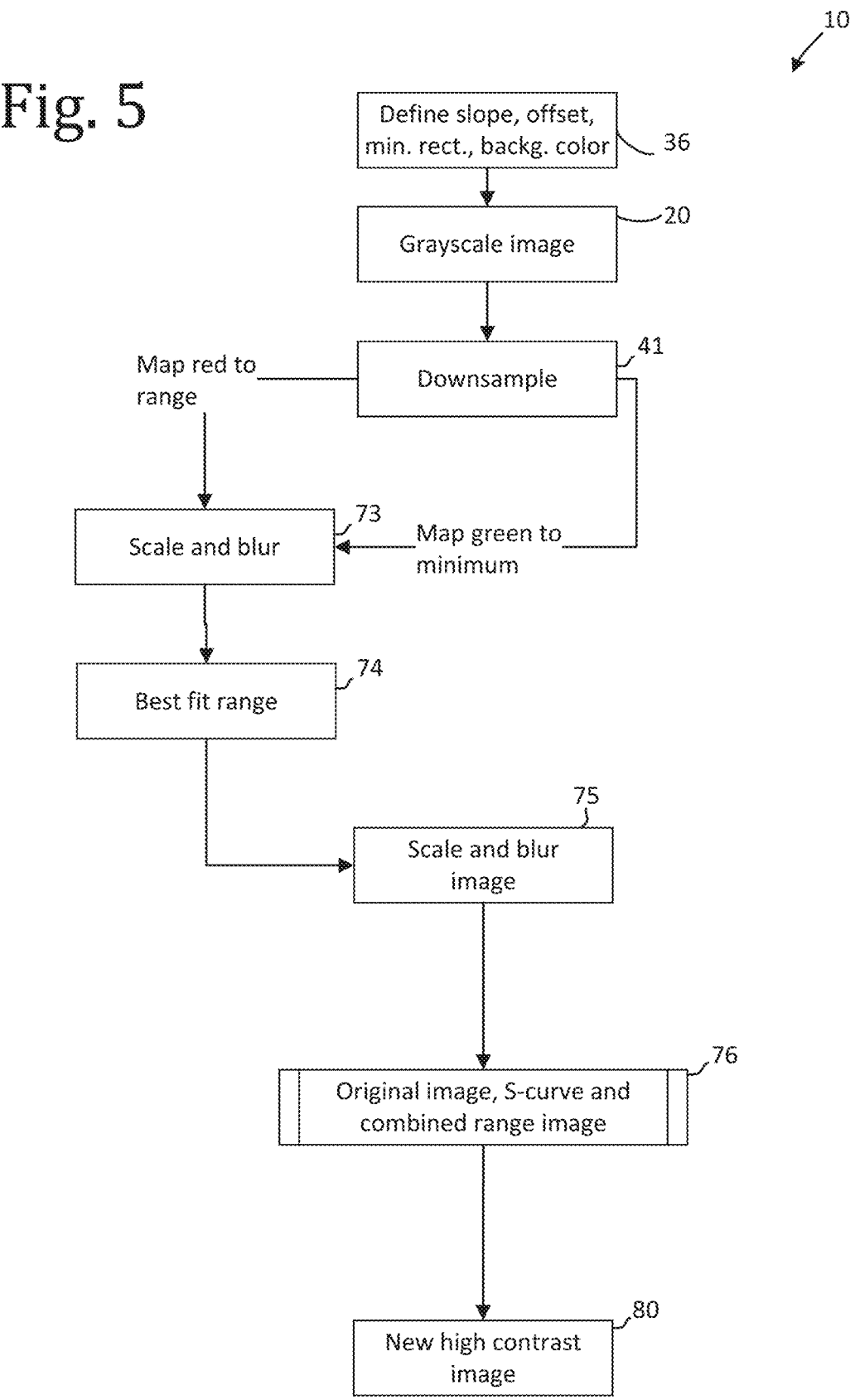
FIG. 5 is a diagrammatic view of an embodiment of the invention featuring dynamic image contrast using red and green channels.
Figure 6:
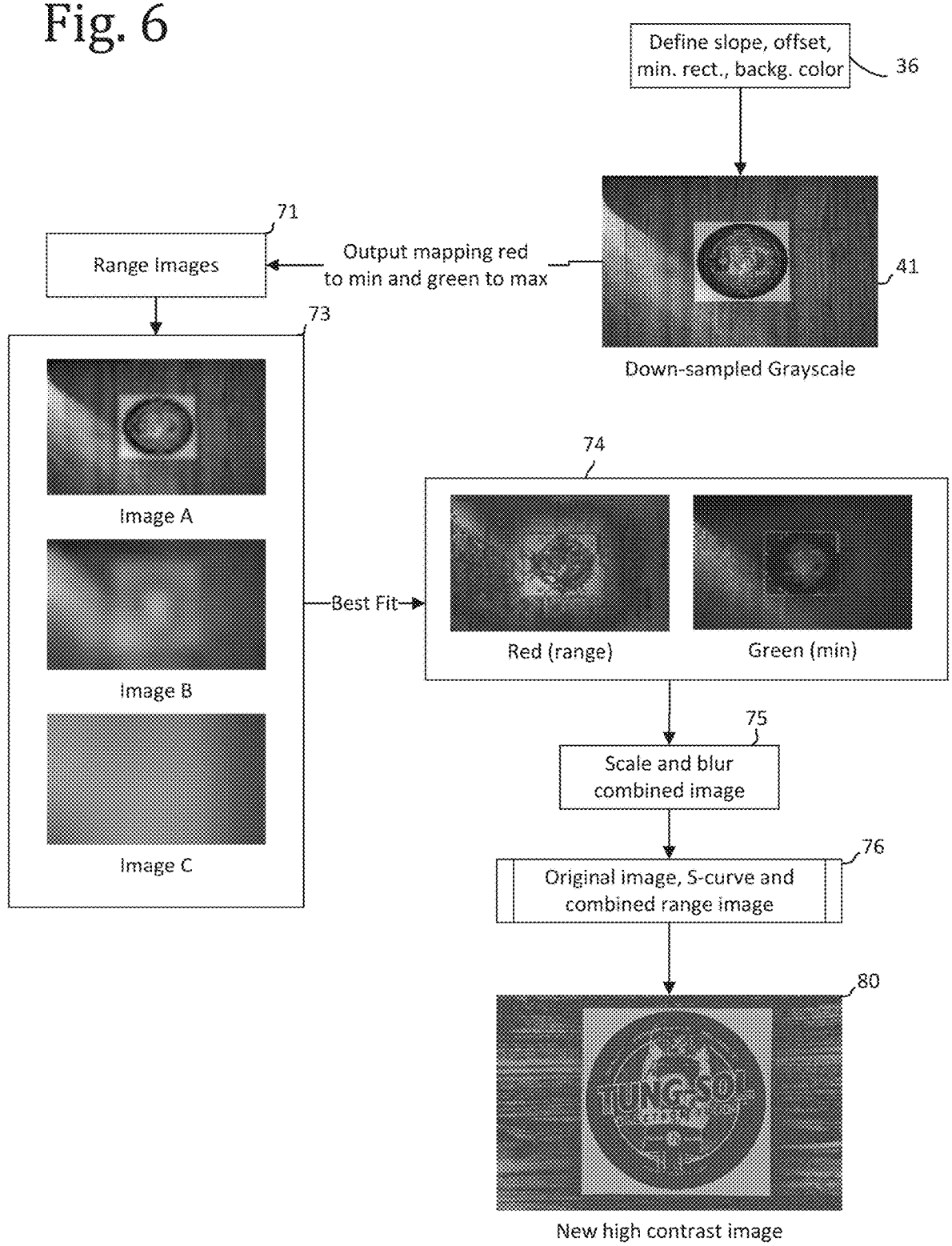
FIG. 6 is a diagrammatic view of an alternative embodiment of the invention featuring dynamic image contrast using red and green channels with exemplary sample images.
Figure 7:
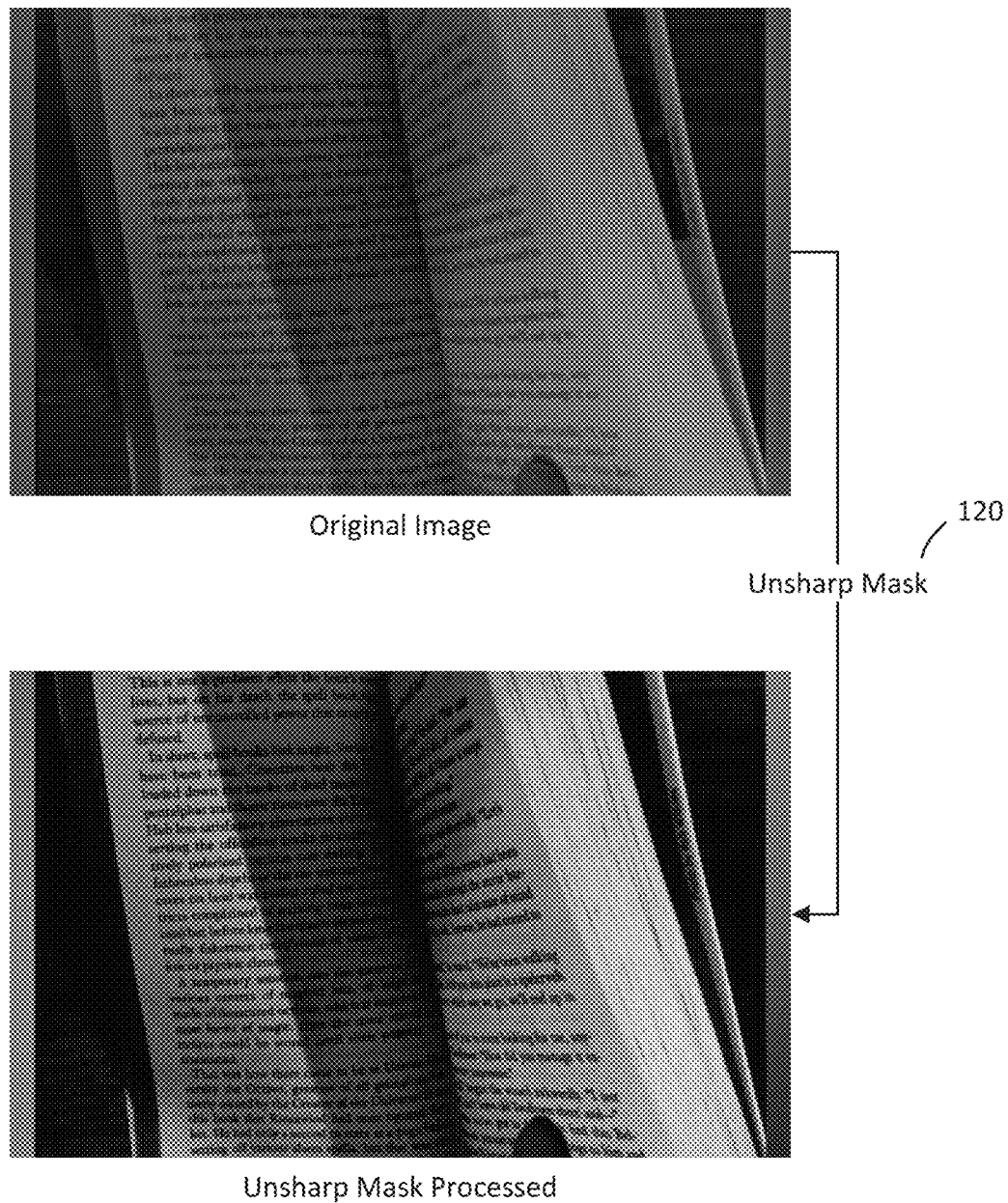
FIG. 7 includes photographic images showing contrast enhancement by using an unsharp mask according to the prior art.

Turning to FIG. 5, the slope, offset, minimum rectangle and background color are all predefined 36. The original image is gray-scaled 20 and down-sampled 41. From grayscale image 20 a red channel is mapped to the range and a green channeled mapped to minimum. The resultant 73 is scaled and blurred such that all are the size of the down-sampled gray scale image 41. The best fit range is determined 74 for the red and green channels and the values for range and minimum are stored. The result is scaled and blurred 75 into a combined image such that it is the same size as an output image. From processing 76 the original image, S-curve and the combined range image, a new high contrast image 80 is generated. FIG. 6 shows the process with some exemplary images where the slope, offset, minimum rectangle and background color are set as constants 36. An image is down-sampled and gray-scaled 41. From image 41, we output mapping of red to minimum and green to maximum to obtain range images 71. The range images are scaled and blurred 73. A best fit range and determined and the values for range and minimum in the red and green channels are generated 74. Then, the combined image is scaled and blurred 75 so it is the same dimensions as the output image. Finally, using the original image, S-curve and combined range image, a calculation 76 produces a new, high contrast image 80. It is not crucial that the combined image is scaled to the same size as the original image. While it would be smoother, in an embodiment of the invention it is left at $\frac{1}{16}^{th}$ scale in order to require less GPU calculations. When performing the final step (76) to produce image (80), GL_LINEAR is used to interpolate between the lower resolution pixels in the combined image.

Applying to Color Images

Adding high contrast to color images is an extension of the use of dynamic contrast. The traditional method uses variants of an unsharp mask to bring out the high contrast edges in color images. This, however, does not take into account gradients or shadows. Some of the detail is lost. This can be seen in the images below.

Figure 8:
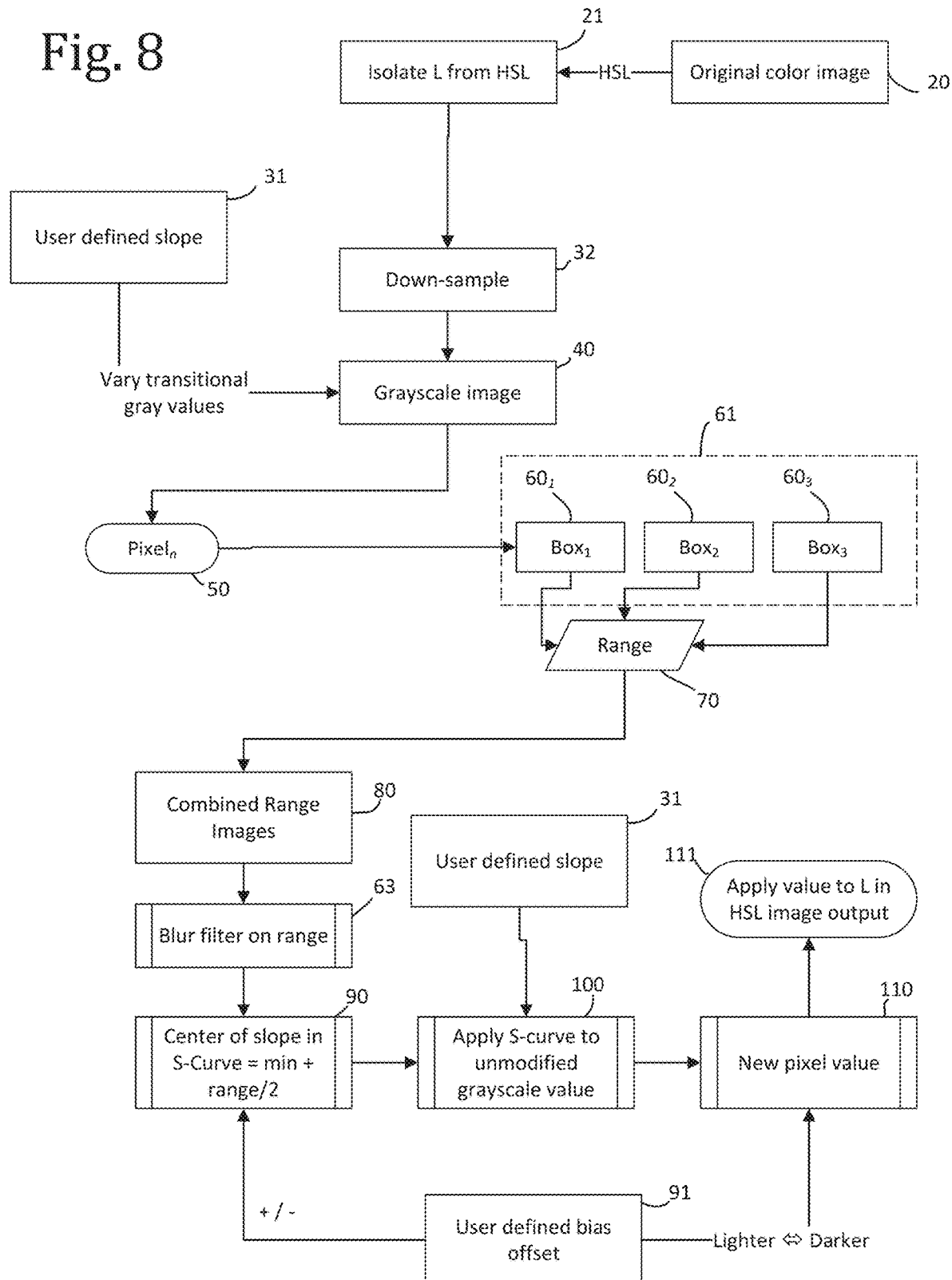
FIG. 8 is a diagrammatic view of an alternative embodiment of the invention applying the invention to the luminosity value in an HSL color domain.
Figure 9:
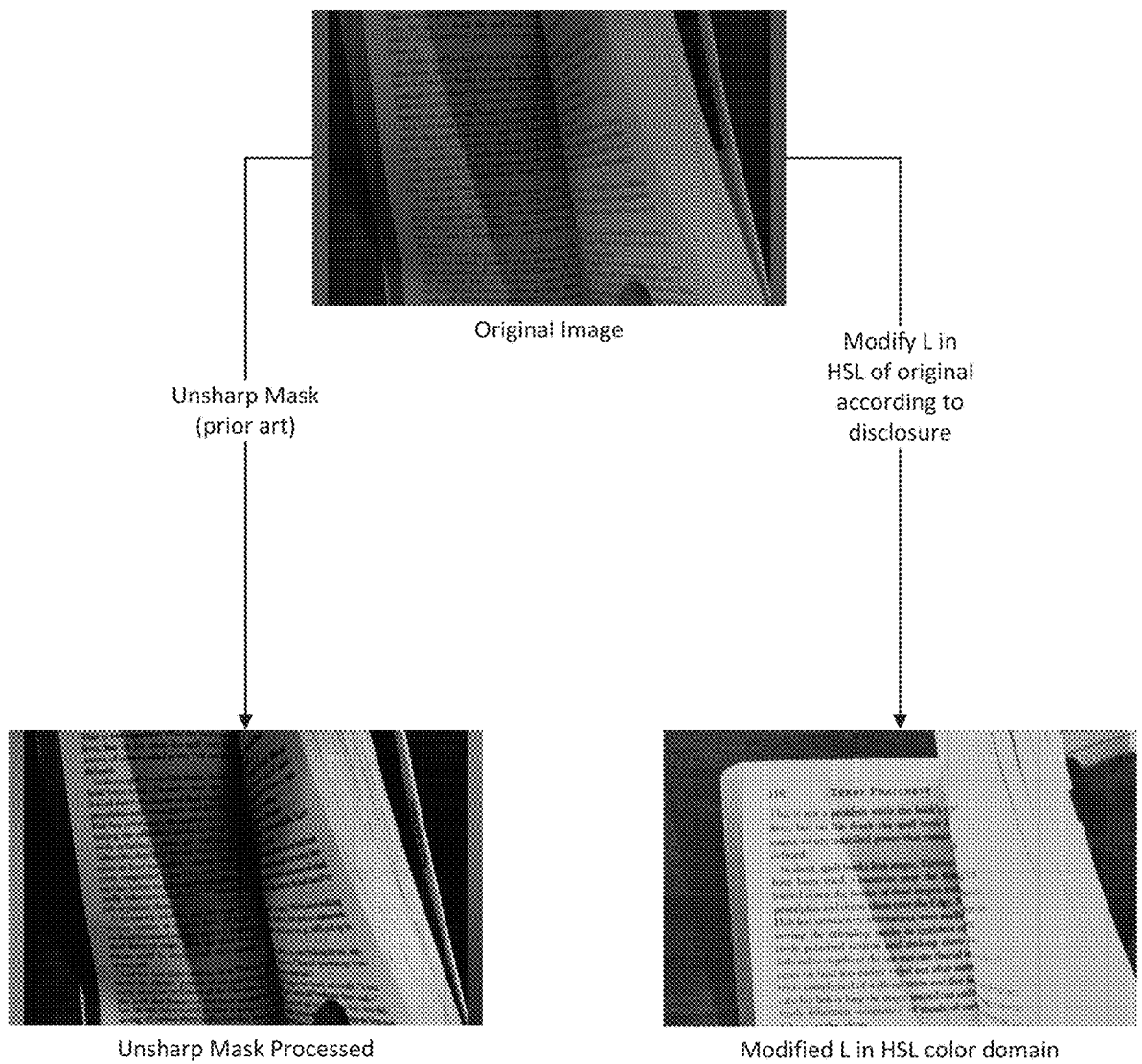
FIG. 9 includes photographic images showing contrast enhancement by using an unsharp mask according to the prior art versus applying the present invention to the luminosity value in an HSL color domain.

We use the dynamic contrast technique described above to apply changes to each pixel in the image. To do this, the color domain of the image is converted into hue, saturation and lightness (HSL) and the lightness (L) value is replaced by the new dynamic contrast value. This allows the hue and saturation of the color to remain unchanged, but the contrast to increase. This process is enumerated in FIG. 8 where the original color image 20 is converted (if required) to an HSL color domain and the luminosity is isolated and processed by the disclosed method. The luminosity is then modified in the final HSL output 111 wherein the hue and saturation values are preserved in the process. FIG. 9 compares the relative output of the present invention to a prior art method of using an unsharp mask.

Finding the edges of in an image relies on contrast changes. By utilizing our method, we can apply any edge detection algorithm in real time to obtain a clean edge image. To further enhance this, we apply a blur to edges we find to provide a clean edge a various thickness.

COMPUTER AND SOFTWARE TECHNOLOGY

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device. Storage and services may be on premise or remote such as in the "cloud" through vendors operating under the brands, MICROSOFT AZURE, AMAZON WEB SERVICES, RACKSPACE, and KAMATERA.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages. Additional languages may include scripting languages such as PYTHON, LUA and PERL.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. A computer-implemented method of high-efficiency contrast enhancement in a digital image, the method comprising:
    creating a grayscale version of the image;
    establishing a threshold contrast quality value;
    establishing an array of fixed-dimension rectangles having a limited number of fixed-dimension rectangles within the array;
    generating from a first pixel in the grayscale version, a first range of pixel intensities derived from neighboring pixels to the first pixel within a first rectangle dimension from the array and saving the first range, the first range having a minimum intensity value and a maximum intensity value;
    determining if the first range is equal to or greater than the threshold contrast quality value, and if equal to or greater than the threshold, skipping additional processing of the first pixel thereby reducing CPU-processing;
    responsive to determining the first range is below the threshold contrast quality value, generating a second range from a second, larger rectangle dimension within the array; repeating the method for each fixed-dimension rectangle within the array until the range equals or exceeds the threshold contrast quality value or each individual fixed-dimension rectangles within the array has been processed by the method whereby further processing of the pixel is abandoned thereby avoiding CPU-intensive latency; and
    generating a higher contrast image from the pixel intensity ranges obtained for each pixel in the grayscale image through the method.

2. The method of claim 1 further comprising the step of applying a blur filter to each of the pixel intensity ranges prior to generating the higher contrast image.

3. The method of claim 1 further comprising the step of interpolating a final pixel intensity range from each range of pixel intensities calculated for each rectangle dimension within the array.

4. The method of claim 3 further comprising the step of weighting the interpolated final pixel intensity ranges towards a predetermined target range.

5. The method of claim 1 further comprising the steps of:
    establishing an S-curve;
    dividing the pixel intensity ranges obtained for each pixel in the grayscale image by two to obtain a quotient and setting the quotient as the center of the slope in the S-curve; and
    applying the S-curve to the grayscale version to obtain the new pixel value in the higher contrast image.

6. The method of claim 5 further comprising the step of applying a bias offset to the center of the slope in the S-curve whereby the bias offset causes the resultant higher contrast image to be lighter or darker.

7. The method of claim 1 further comprising the steps of:
    establishing an S-curve;
    setting a slope value constant; and
    adjusting the slope value constant whereby the slope controls a number of transitional gray values used in each pixel intensity range.

8. The method of claim 1 further comprising the step of down-sampling the grayscale version whereby image noise is reduced from the minimum and maximum pixel intensity values.

9. The method of claim 1 further comprising the step of splitting the calculation of the minimum and maximum pixel intensities into two passes where a first horizontal calculation value is used to calculate a vertical value.

10. A computer-implemented method of high-efficiency contrast enhancement in a color digital image, the method comprising:
    converting the image to a hue, saturation and luminosity (HSL) color domain;
    creating a grayscale version of the image;
    establishing a threshold contrast quality value;
    establishing an array of fixed-dimension rectangles having a limited number of fixed-dimension rectangles within the array;
    generating from a first pixel in the grayscale version, a first range of pixel intensities derived from neighboring pixels to the first pixel within a first rectangle dimension from the array and saving the first range, the first range having a minimum intensity value and a maximum intensity value;
    determining if the first range is equal to or greater than the threshold contrast quality value, and if equal to or greater than the threshold, skipping additional processing of the first pixel thereby reducing CPU-processing;
    responsive to determining the first range is below the threshold contrast quality value, generating a second range from a second, larger rectangle dimension within the array;
    repeating the method for each fixed-dimension rectangle within the array until the range equals or exceeds the threshold contrast quality value or each individual fixed-dimension rectangle within the array has been processed by the method whereby further processing of the pixel is abandoned thereby avoiding CPU-intensive latency; and
    generating a higher contrast image from the pixel intensity ranges obtained for each pixel in the gray scale image through the method whereby only the luminosity of the HSL color domain is modified.

11. The method of claim 10 further comprising the step of applying a blur filter to each of the pixel intensity ranges prior to generating the higher contrast image.

12. The method of claim 11 further comprising the steps of:
- establishing an S-curve;
- dividing the pixel intensity ranges obtained for each pixel in the grayscale image by two to obtain a quotient and setting the quotient as the center of the slope in the S-curve; and
- applying the S-curve to the grayscale version to obtain the new pixel value in the higher contrast image.

13. The method of claim 12 further comprising the step of applying a bias offset to the center of the slope in the S-curve whereby the bias offset causes the resultant higher contrast image to be lighter or darker.

14. The method of claim 10 further comprising the steps of:
- establishing an S-curve;
- setting a slope value constant; and
- adjusting the slope value constant whereby the slope controls a number of transitional gray values used in each pixel intensity range.

15. The method of claim 10 further comprising the step of down-sampling the grayscale version whereby image noise is reduced from the minimum and maximum pixel intensity values.

16. The method of claim 10 further comprising the step of splitting the calculation of the minimum and maximum pixel intensities into two passes where a first horizontal calculation value is used to calculate a vertical value.

17. A computer-implemented method of high-efficiency contrast enhancement in a digital image, the method comprising:
- creating a grayscale version of the image;
- establishing a threshold contrast quality value;
- establishing an array of three fixed-dimension rectangles having three fixed-dimension rectangles within the array;
- generating from a first pixel in the grayscale version, a first range of pixel intensities derived from neighboring pixels to the first pixel within a first rectangle dimension from the array and saving the first range, the first range having a minimum intensity value and a maximum intensity value;
- determining if the first range is equal to or greater than the threshold contrast quality value, and if equal to or greater than the threshold, skipping additional processing of the first pixel thereby reducing CPU-processing;
- repeating the method for each fixed-dimension rectangle within the array until the first range is below the threshold contrast quality value or each individual fixed-dimension rectangle within the array have been processed by the method whereby further processing of the pixel is abandoned thereby avoiding CPU-intensive latency; and
- generating a higher contrast image from the pixel intensity ranges obtained for each pixel in the grayscale image through the method.

* * * * *